United States Patent [19]

Holt et al.

[11] Patent Number: 5,097,530
[45] Date of Patent: Mar. 17, 1992

[54] OPTICAL FIBER ENCLOSURE INCLUDING NOVEL RETAINING RING

[75] Inventors: Neil L. Holt, Redwood City; Marc F. Moisson, San Carlos, both of Calif.

[73] Assignee: Raychem Corporation, Menlo Park, Calif.

[21] Appl. No.: 680,213

[22] Filed: Apr. 4, 1991

[51] Int. Cl.⁵ .............................. G02B 7/00; G02B 6/38
[52] U.S. Cl. ..................................................... 385/135
[58] Field of Search .......................... 350/96.20, 96.21; 264/1.5, 25, 230, DIG. 71

[56] References Cited

U.S. PATENT DOCUMENTS

| | | | |
|---|---|---|---|
| 4,428,645 | 1/1984 | Korbelak et al. | 350/96.20 |
| 4,846,565 | 7/1989 | Swanson et al. | 350/96.22 |
| 4,884,863 | 12/1989 | Throckmorton | 350/96.20 |
| 4,913,522 | 4/1990 | Nolf et al. | 350/96.20 |

FOREIGN PATENT DOCUMENTS

0159857B1 7/1990 European Pat. Off. ......... 350/96.20
WO90/08336 7/1990 PCT Int'l Appl. ............... 350/96.20

*Primary Examiner*—Frank Gonzalez
*Attorney, Agent, or Firm*—A. Stephen Zavell; Herb Burkard

[57] ABSTRACT

The invention comprises a cable splice enclosure comprises a base having an outlet capable of receiving a cable a hollow cover which can be fixed to the base to close at least partially the enclosure such that the adjacent external surfaces of the base and the cover lay substantially flush, in which the base and cover, and a ring means which prevents the separation of the base and cover, said means lying substantially flush with or below said adjacent external surfaces and said ring means having a broader base adjacent the enclosure than the side facing away from the enclosure. The invention also includes a device for joning two items in interdigitated fashion wherein a ring having a cross-sectional base greater adjacent the two items to be joined than away therefrom lies in a recess between the two parts to be joined.

7 Claims, 3 Drawing Sheets

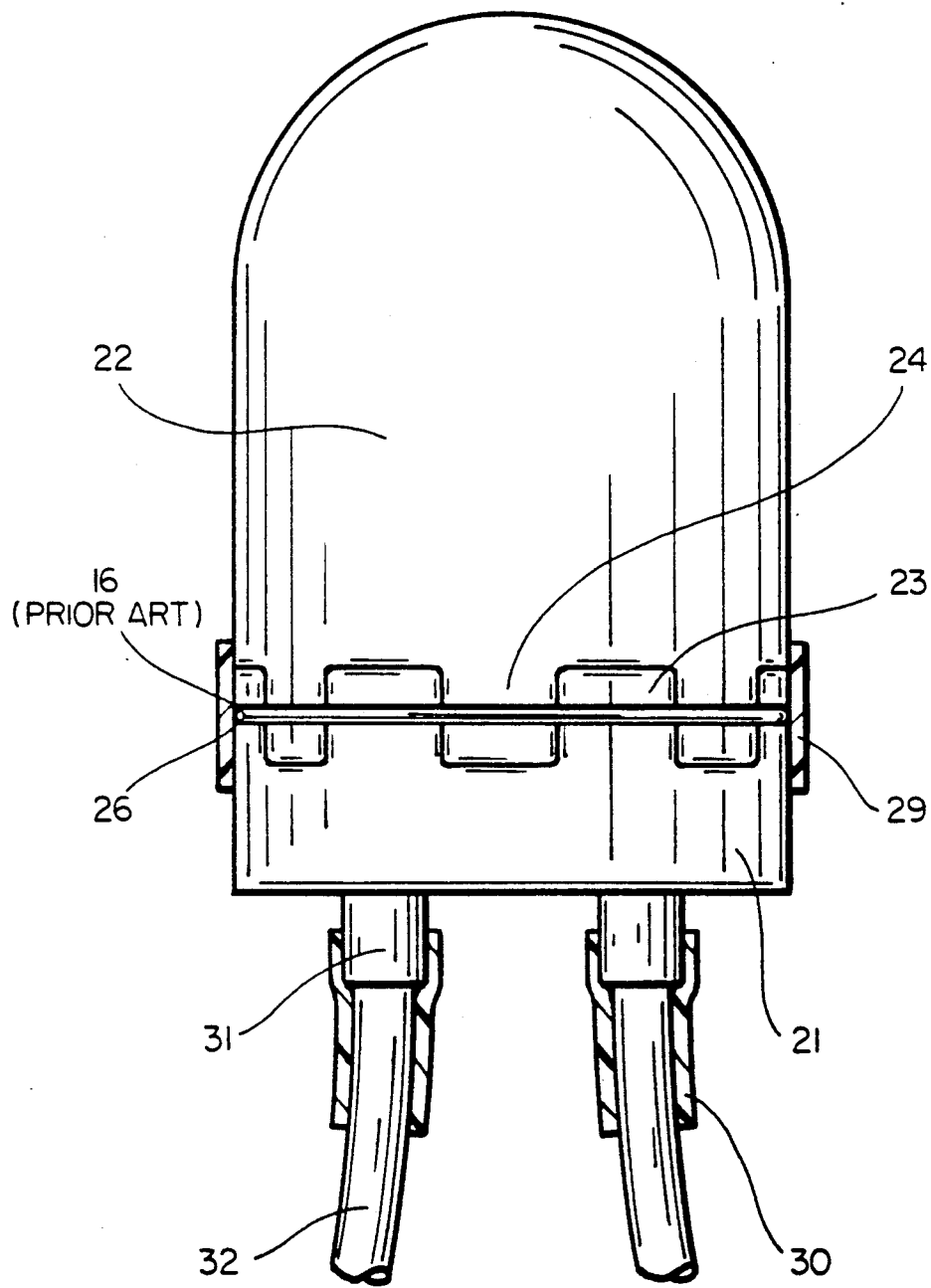
FIG_1

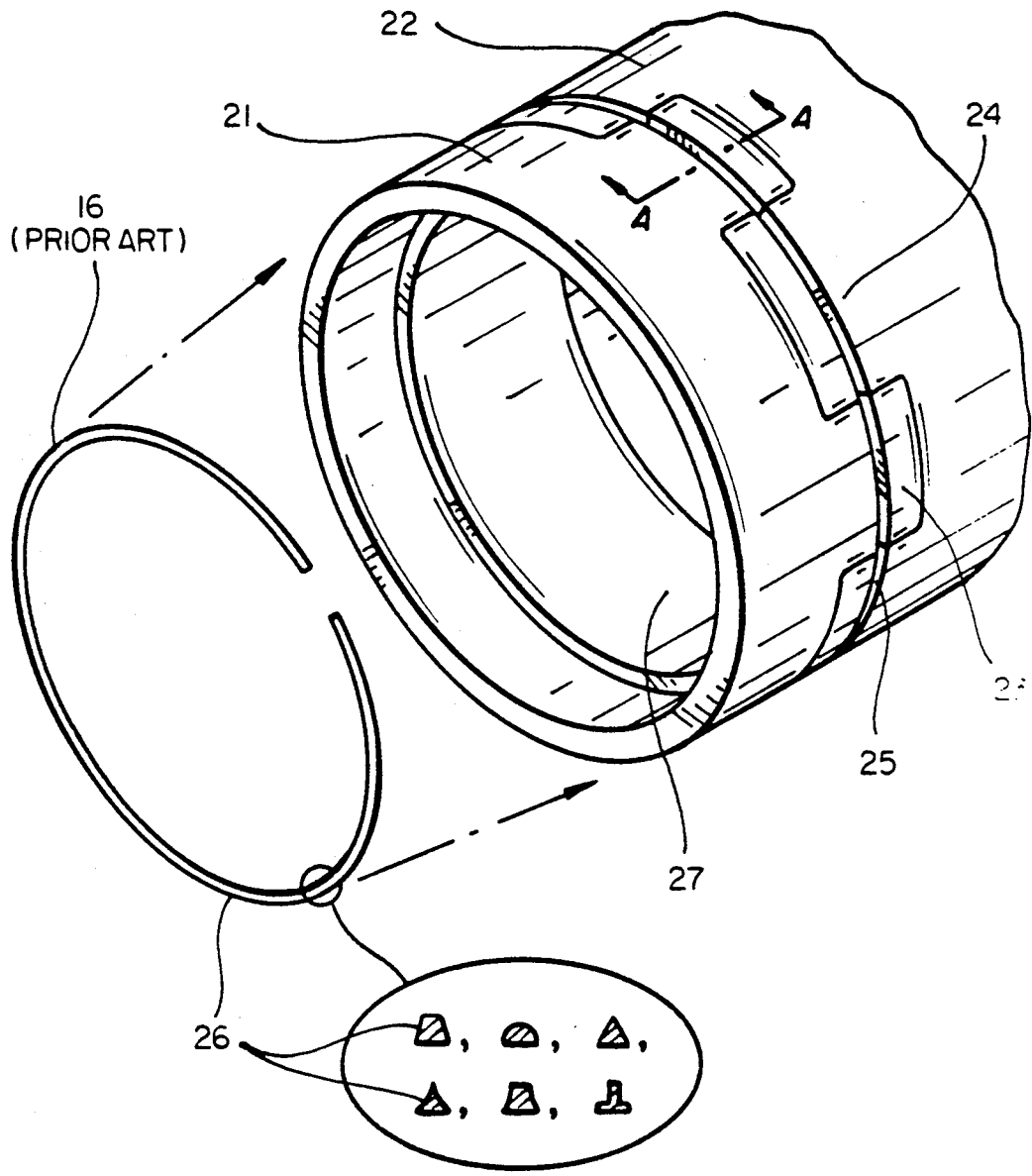
FIG_2

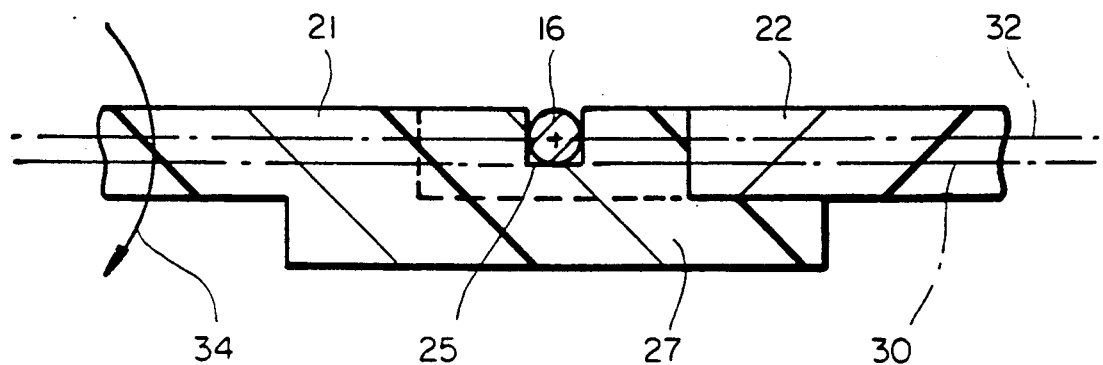
FIG_3
(PRIOR ART)
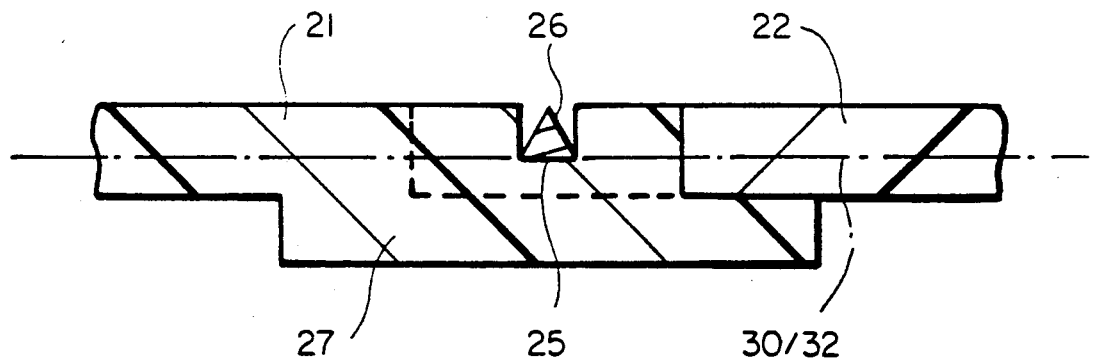
FIG_4

OPTICAL FIBER ENCLOSURE INCLUDING NOVEL RETAINING RING

This application relates to enclosures which are enclosed in part 5 by an interdigitated structure of base and top member and a retaining ring. More specifically, this invention relates to optical fiber enclosures including an interdigitated base and top member affixed together with a retaining ring.

BACKGROUND OF THE INVENTION

A product marketed with an interdigitated base and top member held together by a retaining ring is marketed by Raychem Corporation under the name FOSC®(B) Closure. This closure is, at least in part, described in PCT International Publication No. WO90/08336 and Great Britain priority application No. 800932.8 the former of which was filed Jan. 17, 1990, and the later of which was filed Jan. 17, 1989. Both these applications are incorporated herein by reference for all purposes. Although this product functions extremely well, the castellated flanges, i.e., interdigitated base and top members, which are locked together by a circular, round in cross-section retaining ring contained within a groove extending through the flanges, exhibit certain tendencies to pull apart through the deflection of certain of the flanges and the ring popping out of the groove at temperatures of about 70° C. The retaining ring exerts a force on the castellated flange off center from the neutral axis, i.e., the axis running through the base of the groove. This produces a bending moment in the flange which causes flange deflection. The deflection may be great enough such that the ring pops out of the groove allowing the base to separate from the domed top member. Thus, it would be highly desirable to have a retaining ring and structure which avoids this problem for high temperature applications, i.e., about 70° C., to extend the useful temperature range of the product.

SUMMARY OF THE INVENTION

The invention possesses the desirable features recited above as well as provides many other benefits obvious to the ordinary skilled artisan. More specifically, the invention comprises an enclosure where the castellated, i.e., interdigitated, flanges are held together by a retaining ring in a groove which exerts its force or moment of force along the neutral axis of the groove base to avoid flange deflection and separation. In particular, this can be achieved by a retaining ring having cross-section which is wider base, i.e., at the bottom of the groove in the flange than the open side away from the base of the groove.

BRIEF DESCRIPTION OF THE DRAWINGS

FIG. 1 shows an installed splice case of the invention as well as a prior art splice case.

FIG. 2 illustrates the castellated flange and retaining ring of the invention and the prior art.

FIG. 3 illustrates the flange and retaining ring of the prior art with the force above the neutral axis of the flange.

FIG. 4 illustrates the flange and a retaining embodiment of the invention with the force along the neutral axis.

DESCRIPTION OF THE PREFERRED EMBODIMENTS

The invention will be more clearly illustrated by referring to the drawings. FIG. 1 shows a cable splice enclosure, of the butt design, particularly for optical fiber cables and employing the invention. Here, the base of the enclosure comprises the first part 21, outlets 31 being integral with the projection 23. Similarly the cover 22 which is preferably blind at one end, and especially is dome-shaped, is integral with the projections 24. Each part 21, 22 may, however, comprise more than one component. Sealing sleeves 29 and 30 shown in cross-section sealing the parts 21, 22 together and sealing cables 32 to the outlets 31, respectively. The prior art and novel retaining ring for the castellated, i.e., interdigitated flanges, is illustrated as 16/26.

FIG. 2 illustrates the enclosure or joining device of the invention which is incorporated into the design of FIG. 1. First and second hollow parts 21, 22 are joined together through first and second projections 23, 24 that mate in an interdigitated fashion. The projections need not extend all around the circumference of the parts, but do so in the preferred embodiments. The projections have recesses 25, e.g., a groove therein, into which can be positioned the retaining ring of the prior art and that of the invention for preventing separation. Such ring means 16/26 preferably comprises a ring, preferably split ring, and preferably one that is one resiliently deformable so that it can be snapped into the recess 25. The ring may comprise any suitable material, including metal and plastics. The external surfaces of parts 21, 22 that are adjacent a preferably substantially mutually flush and the ring 26 is preferably flush with them or recessed. The projections may prevent relative rotation of parts 21, 22 and ring 16/26 prevents axially separation.

This illustration of the invention is clarified in reference to FIGS. 3 and 4. The prior art ring 16 when in place in the groove 25 exhibits a moment of force 32 above the neutral axis, depicted as 30, such that the flange is subject to bending at pressure and temperature, as indicated by arrow enumerated as 34. This moment of force above the neutral axis is generally achieved by the product's circular ring.

We have unexpectedly discovered in our invention that as illustrated in FIG. 4, when the cross-section of the retaining ring 26 has a broader base member, the force 32 is now along the neutral axis 30 at the base of the recess 25. Returning to FIG. 2, suitable retaining rings of the invention can have a cross-section illustrated in the blowup, i.e., trapezoidal, semi-circular, triangular, cusped triangular, cusped trapezoidal, inverted "T" shape, and the like. In practice, any configuration which creates the force along the neutral axis 30 at the base of the recess 25 is suitable for use in the invention. In particularly preferred embodiments, the ring is constructed of a spring steel material and sized so that the ends of the split ring abut securely upon installation.

The invention has been described with reference to particularly preferred embodiments. Modifications which would be obvious to the ordinary skilled artisan are contemplated to be within the scope of the invention.

What is claimed:

1. A cable splice enclosure comprising:

a base having an outlet capable of receiving a cable; and a hollow cover which can be fixed to the base in an interdigitated fashion to close at least partially the enclosure so that the adjacent external surfaces of the base and cover lay substantially mutually flush, in which the base and cover have means which can prevent their separation, said means lying substantially flush with or below said external surfaces, and said means having a cross-sectional shape which exerts a force substantially along the neutral axis of the mating of the base and the cover.

2. The enclosure according to claim 1 wherein the means for preventing the separation is a retaining ring within a groove in the interdigitated portions in the hollow cover and the base and the retaining ring has a cross-section along its base adjacent to the enclosure which is broader than the portion away from the enclosure.

3. The enclosure according to claim 2 wherein the retaining ring has a cross-section selected from the group consisting of trapezoidal, semi-circular, triangular, cusped triangular, cusped trapezoidal, and inverted "T" shape.

4. The apparatus according to claim 3 wherein the cross-section of the retaining ring has a trapezoidal shape.

5. A joining device which comprises a first hollow part having a generally cylindrical portion comprising first axially-extending projections, the projections having generally circumferentially-extending first recesses in an external surface thereof;

a second hollow part having a generally cylindrical portion comprising second axially-extending projections, the projections having generally circumferentially-extending second recesses in external surfaces thereof, the first hollow part being capable of being fixed to the second hollow part with the first and second projections mated in an interdigitated fashion, the first and second recesses lying on a common circle; and a ring that can be positioned in the first and second recesses to prevent axially separation of the first and second parts, the ring having a cross-section at its base adjacent to the first and second parts which is broader than its cross-section away from the first and second parts.

6. The joining device according to claim 5 wherein the ring has a cross-section selected from the group consisting of trapezoidal, semi-circular, triangular, cusped triangular, cusped trapezoidal, and inverted "T" shape.

7. The apparatus according to claim 6 wherein the cross-section of the ring has a trapezoidal shape.

* * * * *